United States Patent
Okamoto

(10) Patent No.: US 7,969,498 B2
(45) Date of Patent: Jun. 28, 2011

(54) DIGITAL CAMERA

(75) Inventor: Teppei Okamoto, Saitama (JP)

(73) Assignee: Hoya Corporation, Tokyo (JP)

( * ) Notice: Subject to any disclaimer, the term of this patent is extended or adjusted under 35 U.S.C. 154(b) by 394 days.

(21) Appl. No.: 12/331,705

(22) Filed: Dec. 10, 2008

(65) Prior Publication Data

US 2009/0153723 A1    Jun. 18, 2009

(30) Foreign Application Priority Data

Dec. 14, 2007    (JP) ................. 2007-323743

(51) Int. Cl.
*H04N 5/222* (2006.01)
(52) U.S. Cl. ................. 348/333.13; 348/333.02
(58) Field of Classification Search ............. 348/333.13, 348/333.02
See application file for complete search history.

(56) References Cited

U.S. PATENT DOCUMENTS

| | | | |
|---|---|---|---|
| 7,440,116 B2 * | 10/2008 | Bankhead et al. ............ 356/515 |
| 2005/0104997 A1 * | 5/2005 | Nonaka ......................... 348/360 |
| 2005/0275738 A1 | 12/2005 | Arai |
| 2006/0110156 A1 | 5/2006 | Kurosawa |
| 2007/0151066 A1 | 7/2007 | Seo |
| 2008/0049119 A1 | 2/2008 | Yamamoto |
| 2008/0055433 A1 * | 3/2008 | Steinberg et al. ............ 348/241 |
| 2008/0175582 A1 | 7/2008 | Furumochi |

FOREIGN PATENT DOCUMENTS

| JP | 2002-209147 A | * | 7/2002 |
|---|---|---|---|
| JP | 2005-341381 | | 12/2005 |

OTHER PUBLICATIONS

English language Abstract of JP 2005-341381, Dec. 8, 2005.
U.S. Appl. No. 12/331,706 to Kanzaki et al, which was filed on Dec. 10, 2008.

* cited by examiner

*Primary Examiner* — James M Hannett
(74) *Attorney, Agent, or Firm* — Greenblum & Bernstein, P.L.C.

(57) ABSTRACT

A digital camera has a measuring part and a display part. The measuring part measures a certain quantity from the moment of photographing a cleaning image. The display part displays the cleaning image in the case that the certain quantity is less than a predetermined threshold.

6 Claims, 3 Drawing Sheets

DIGITAL CAMERA

BACKGROUND OF THE INVENTION

1. Field of the Invention

The present invention relates to a digital camera, and more particularly, to a digital camera capable of cleaning its image sensor or an optical component attached to the image sensor.

2. Description of the Related Art

A conventional digital camera may have a detachable lens. A subject image entering through the lens is directed to an optical finder through a return mirror. The user finds the subject image through the optical finder. When the user pushes the shutter release button, the return mirror is raised, the shutter curtain opens, and light from the subject arrives at the image sensor. The image sensor produces the subject image as an electrical signal, and outputs it as image data. Then, the shutter curtain is closed. Shutter operation includes raising the return mirror and opening and closing the shutter curtain. The image data is processed and stored on a recording medium as an image file.

The image sensor is provided in a mirror box of a digital camera with movable elements such as a shutter curtain and a return mirror. These movable elements move whenever a photograph is taken, and graze the supports of the movable elements, creating dust particles between the supports and the movable elements. Additionally, in the case of a digital camera having a detachable lens, dust particles may enter the mirror box when the lens is removed. These dust particles may become attached to the image sensor and block light arriving at the imaging sensor. The dust particles may thereby reduce the quality of a photographed image.

To solve this problem, Japanese Unexamined Patent Publication (KOKAI) No. 2005-341381 discloses that pixels having low output value in an image signal are detected, and the data for those pixels is corrected under the assumption that dust particles are attached at those pixel locations.

However, according to conventional constructions which locate dust particles, the location of dust particles on the low-pass filter may change over time or after many shutter operations. The user cannot reliably pinpoint the location of dust particles on the low-pass filter in such a situation.

SUMMARY OF THE INVENTION

An object of the present invention is to provide a digital camera capable of easily cleaning a low-pass filter.

The present invention is a digital camera having a measuring part and a display part. The measuring part measures a certain quantity from the moment a cleaning image is taken. The display part displays the cleaning image so long as the quantity is less than a predetermined threshold.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

An embodiment of the digital camera according to the present invention is described with reference to the figures.

Figure 1:
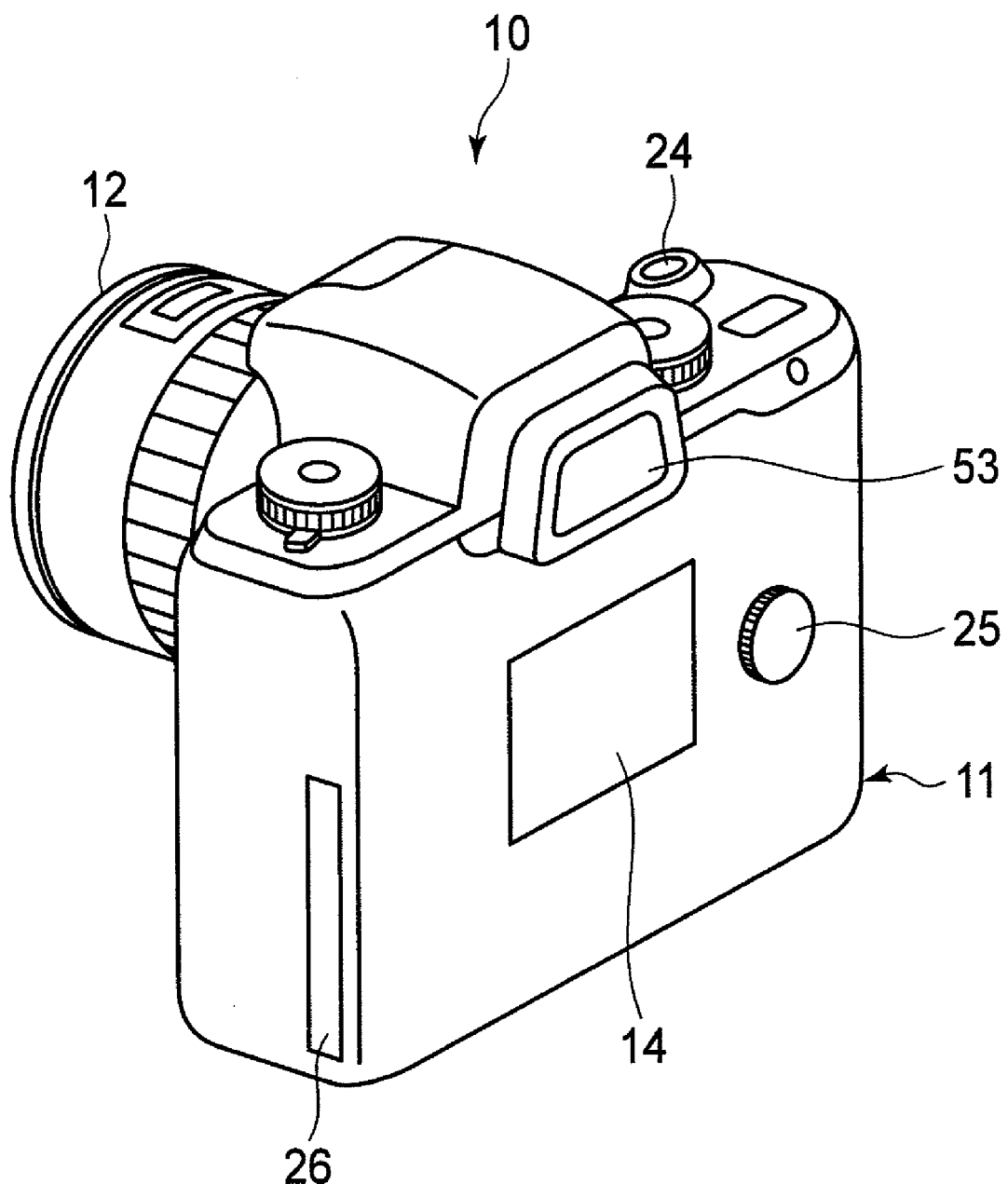
FIG. 1 is an external view of the digital camera according to the embodiment of the present invention.
Figure 2:
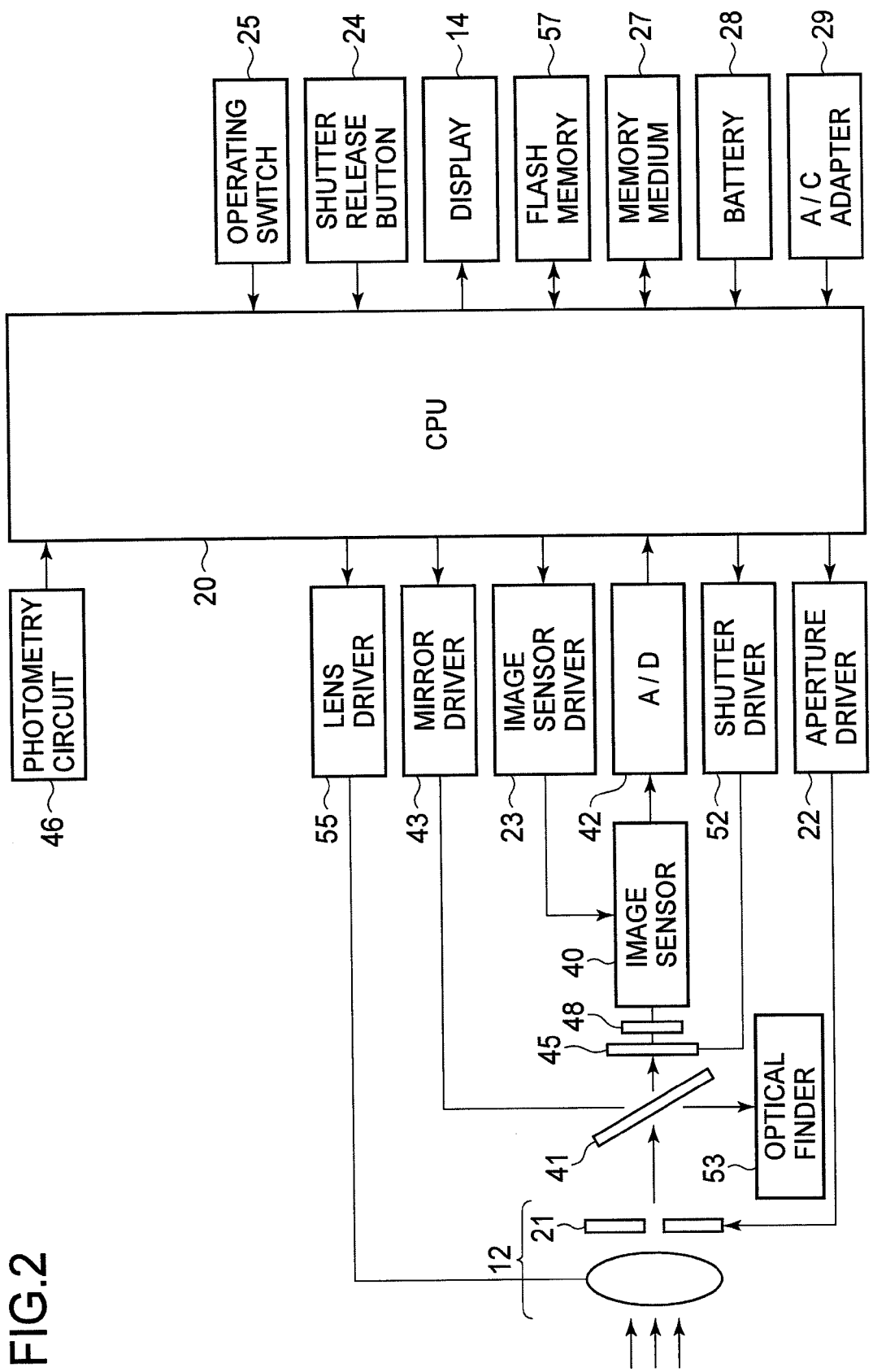
FIG. 2 is a black diagram of the digital camera.

The construction of a digital camera 10 and lens 12 is described with reference to FIGS. 1 and 2. The digital camera 10 mainly comprises a body 11, a display 14 provided in the body 11, a shutter release button 24, an operating switch 25, a card slot 26, and an optical finder 53.

A CPU 20 is provided in the digital camera 10. A flash memory 57 connected to the CPU 20 stores programs which the CPU executes. The CPU 20 reads the programs from the flash memory 57 and executes them when the digital camera 10 is powered.

An aperture diaphragm 21 is provided in the lens 12, and controlled by an aperture driver 22 so as to open or close the aperture. A subject image entering through the lens 12 is directed to the optical finder 53 through a return mirror 41. The user finds the subject image through the optical finder 53.

When the user pushes the shutter release button 24 halfway, a photographing preparation signal is sent from the shutter release button 24 to the CPU 20. After receiving the photographing preparation signal, the CPU 20 controls the lens driver 55 so as to drive the lens 12 to focus on the subject. A photometry circuit 46 is controlled by the CPU 20 and sends exposure information to the CPU 20. The CPU 20 receives the exposure information, and calculates shutter speed and F-number using the exposure information.

When the shutter release button 24 is fully depressed by the user, an imaging operation is processed. The imaging operation starts from the transmission of signals to each circuit by the CPU 20 to the transmission of image data to the CPU 20. In detail, CPU 20 sends signals to the aperture driver 22, the mirror driver 43, and the shutter driver 52. The aperture driver 22 controls the aperture diaphragm 21. The mirror driver 43 raises the return mirror 41. The shutter driver 52 opens and closes the shutter curtain 45. The CPU 20 increases the count of shutter opening and closing cycles by one and stores the number in the flash memory 57 for each cycle. Hereinafter, the number of shutter opening and closing cycles is termed the shutter release count. Thus, the subject image is formed on the image sensor (CCD) 40 through low-pass filter 48.

The image sensor 40 is controlled by a sensor driver 23, so as to capture an image signal, and sends the captured image signal to an A/D converter 42. The A/D converter 42 converts the captured image signal to image data, and sends it to the CPU 20. The CPU 20 processes the image data to into an image file and outputs the image file. In this image processing, the CPU 20 inverts the image from top to bottom and right to left, adjusts color contrasts, and compresses it into JPEG format so that the image file is created. In the image processing, a noise reduction process may be performed if the image data has noise. The image file is stored on the memory medium 27 which is inserted into the card slot 26. The memory medium 27 may be, for example an SD card™, a compact flash card™, etc. These devices are powered by the battery 28 or the A/C adapter 29.

The image data stored on the memory medium is displayed on the display 14 by the user operating the operating switch 25. The image data appearing on the display 14 will be upright because it was processed that way.

The CPU 20 may control the mirror driver 43 so as to keep up the return mirror 41, and to keep open the shutter curtain 45. The CPU 20, the mirror driver 43, and the shutter driver 52 consume electricity while keeping up the return mirror 41 and keeping open the shutter curtain 45. The user may detach the lens 12 from the digital camera 10 and has free access to clean the low-pass filter 48 from the outside of the digital camera 10 because the return mirror 41 is out of the way and the shutter curtain 45 is open.

The user may change configurations and operating modes of the digital camera 10 by using switch 25. The operating modes include a photographing mode, an image viewing mode, a sensor cleaning mode, and so on. The photographing mode is used for photographing a subject, i.e., normal photographing. The image viewing mode is used for displaying an image file which is stored in the recording medium 27 on the display 14. The sensor cleaning mode is used for cleaning the low-pass filter 48. When the user changes the operating mode, a configuration window is displayed on the display 14. The user may change the operating mode by operating the switch 25 with reference to the configuration window.

Figure 3:
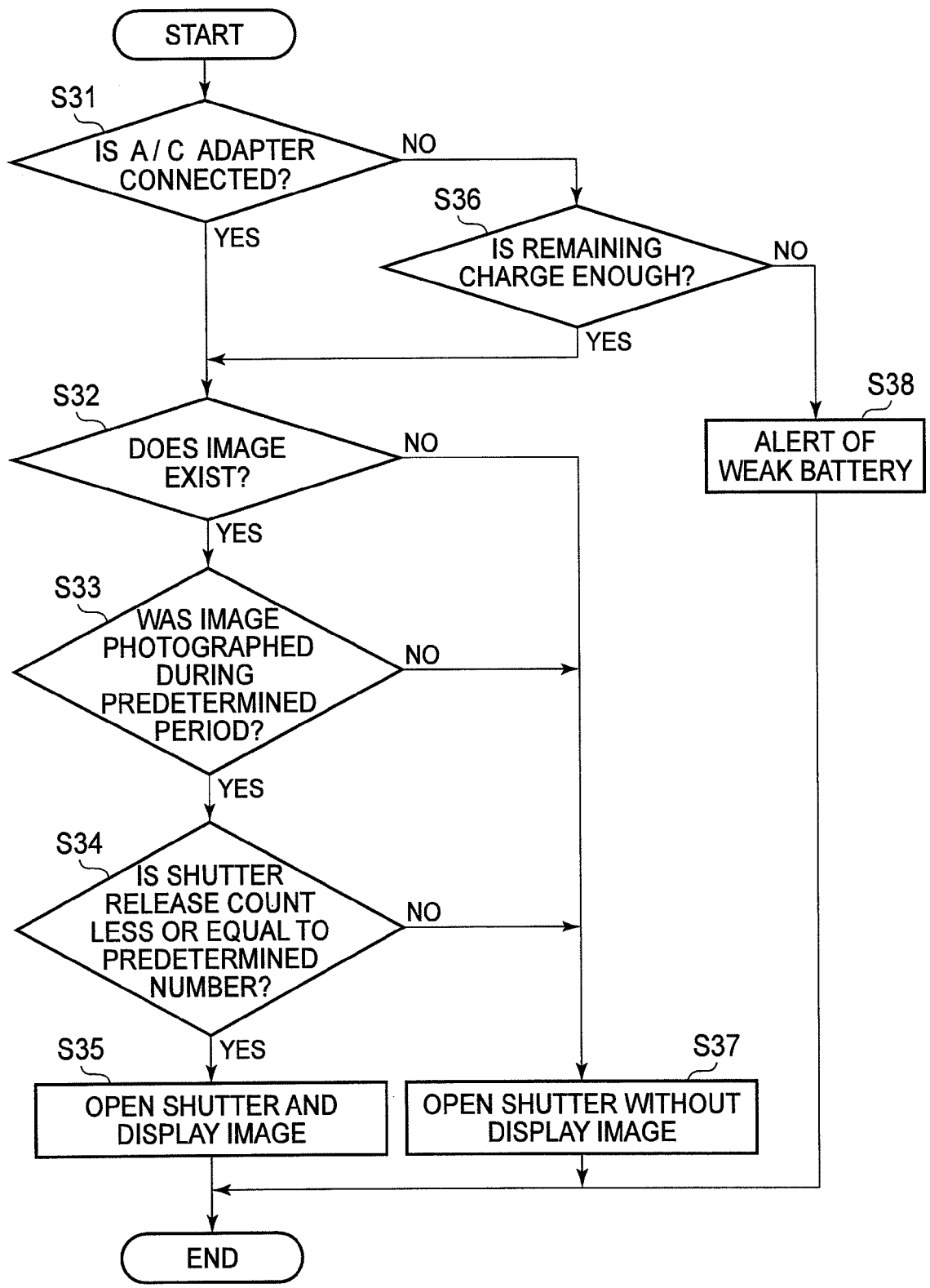
FIG. 3 is a flowchart showing a cleaning-preparation process of the digital camera.

Next, the cleaning-preparation process is described hereinafter with reference to FIG. 3. The cleaning-preparation process is performed when the user selects the cleaning mode by operating the operating switch 25.

Step S31 and S36 is executed to confirm that there is enough electric power to hold the return mirror 41 up and the shutter curtain 45 open a time of reasonable length for cleaning the low-pass filter 48. In step S31, it is determined whether the A/C adapter is connected to the digital camera 10 or not. In the case that the A/C adapter is not connected, it is determined whether the remaining charge in the battery 28 is enough to hold the return mirror 41 up and the shutter curtain 45 open or not. In the case that the remainder is insufficient, the process displays an alert message which indicates that the remainder is insufficient, and ends. In the case that the remainder is sufficient or the A/C adapter is connected, the process proceeds to step S32.

Performing these steps prevents the return mirror 41 from falling and the shutter curtain 45 from closing, so that the user can clean the low-pass filter 48 safely.

In step S32, it is judged whether the cleaning image exists or not. The cleaning image is created by photographing a white object covering the whole field of view. For example, when the cleaning image is photographed, the aperture diaphragm 21 is narrowed down, and shutter speed is set to the slowest depending on the F-number. Focus of the lens 12 is set to infinity, exposure compensation is set to slightly strong, and image size is set to the largest among the sizes which the digital camera 10 is able to photograph. The noise reduction process is not executed.

The photographed cleaning image is stored in a different folder from the folder which stores normal images. For examples, a folder having the name "DUST" is provided in the root folder of the memory medium 27. The cleaning image file, named, for example, "DUST.JPG", is stored in the "DUST" folder. In the step S32, the CPU 20 determines whether "DUST.JPG" is stored in the "DUST" folder or not.

In the case that cleaning image does not exist, the process proceeds to step S37. In step S37, the CPU20 holds the return mirror 41 up and the shutter curtain 45 open without displaying the cleaning image on the display 14, so that the user can access the low-pass filter for cleaning.

In the case that cleaning image exists in step S32, the process proceeds to step S33.

In step S33, it is determined whether the cleaning image is photographed during a predetermined period (the certain quantity) or not. For example, in the case that it takes more than thirty minutes after photographing of the cleaning image, the process proceeds to step S37. In the case that it takes many times after photographing of the cleaning image, the location of the attached dust particles on the low-pass filter 48 may have changed, so that the user can not precisely recognize the surface condition of the low-pass filter 48 by referring to the cleaning image. Therefore, the CPU20 holds the return mirror 41 up and the shutter curtain 45 open without displaying the cleaning image on the display 14. The user can access the low-pass filter for cleaning without being misled by a low-confidence cleaning image.

In the case that the cleaning image is photographed during a predetermined period in step S33, the process proceeds to step S34.

In step S34, it is determined whether the shutter release count is less or equal to a predetermined number (the certain quantity). The shutter release count equals the shutter release count at the start of the cleaning-preparation process minus the shutter release count at the moment of photographing a cleaning image. For example, in the case that the shutter release count is larger than fifty (the predetermined threshold), the process proceeds to step S37.

In the case that the shutter release count is larger than to fifty, the location of the attached dust particles on the low-pass filter 48 may have changed, so that the user can not precisely recognize the surface condition of the low-pass filter 48 with reference to the cleaning image. Therefore, the CPU20 holds the return mirror 41 up and the shutter curtain 45 open without displaying the cleaning image on the display 14 in step S37. The user can access the low-pass filter for cleaning without being misled by a low-confidence cleaning image.

In the case that the shutter release count is less or equal to fifty, the CPU20 holds the return mirror 41 up and the shutter curtain 45 open in step S35.

According to the embodiment, the user can effectively clean the low-pass filter with reference to a cleaning image which represents the location of the dust particles attached to the low-pass filter 48.

Note that dust particles are attached to the low-pass filter 48 in the present embodiment. However, in the case that the low-pass filter 48 is not provided, dust particles which are attached to the image sensor 40 or a color filter attached to the imaging surface of the image sensor 40 may be photographed and cleaned.

A cleaning image file might also be created under different circumstances than those described above as long as it is an image with which the user may find dust particles.

A cleaning image need not be stored in the "DUST" folder, and may have dust image information written in its tag area. Dust image information is written in a cleaning image file as part of the tag information, and indicates that a file contains a cleaning image. The CPU 20 can judge whether a cleaning image exists by reading the tag information of an images.

The subject photographed to produce the cleaning image need not be a white object, and may be an object having even color with which the user can easily pinpoint dust particles. The aperture diaphragm 21 need not be narrowed down, but be narrowed so as to make dust particles easily distinguishable by the user. Shutter speed need not be set to the slowest depending on the F-number, but may be chosen according to the F-number. Focus of the lens 12 need not be set to infinity, but may be set so as to focus on an object covering the whole field of view. Exposure compensation need not be set to slightly strong, but may be set to a configuration in which dust particles stand out. Exposure need not be compensated. Also, the noise reduction process may be performed.

In step S33, a predetermined period need not be thirty minutes, but may be a time period over which the location of dust particles is unlikely to change.

In step S34, a predetermined number need not be fifty times, but may be a number for which location of dust particles is unlikely to change.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2007-323743 (filed on Dec. 14, 2007), which is expressly incorporated herein, by reference, in its entirety.

The invention claimed is:

1. A digital camera comprising:
   a measuring part that measures a certain quantity from the moment of photographing a cleaning image; and
   a display part that displays the cleaning image in the case that the certain quantity is less than a predetermined threshold.

2. The digital camera according to claim 1, wherein the certain quantity is the number of shutter curtain releases from the moment of photographing a cleaning image until the present time.

3. The digital camera according to claim 1, wherein the certain quantity is the time elapsed from the moment of photographing a cleaning image until the present time.

4. The digital camera according to claim 1, further comprising a control part that releases a shutter curtain in the case that the certain quantity is less than or equal to a predetermined threshold.

5. The digital camera according to claim 1, further comprising a control part that lifts a return mirror in the case that the certain quantity is less than or equal to a predetermined threshold.

6. The digital camera according to claim 1, further comprising a confirmation part that confirms that the remaining battery charge is greater than a predetermined threshold, said display part displaying the cleaning image in the case that the certain quantity is less than a predetermined threshold and in the case that the remaining battery charge is greater than a predetermined threshold.

* * * * *